(12) United States Patent
Tunali et al.

(10) Patent No.: US 10,452,750 B2
(45) Date of Patent: Oct. 22, 2019

(54) SYSTEMS AND METHODS FOR INTERACTIVELY PRESENTING A VISIBLE PORTION OF A RENDERING SURFACE ON A USER DEVICE

(71) Applicant: Google Inc., Mountain View, CA (US)

(72) Inventors: Haluk Burcin Tunali, North Bergen, NJ (US); Luiz do Amaral de Franca Pereira Filho, Jersey City, NJ (US); Etan Bukiet, New York, NY (US); Behnoosh Hariri, New York, NY (US); Kevin Winter, Metuchen, NJ (US); Igor Kopylov, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 132 days.

(21) Appl. No.: 15/228,381

(22) Filed: Aug. 4, 2016

(65) Prior Publication Data

US 2017/0039169 A1 Feb. 9, 2017

Related U.S. Application Data

(60) Provisional application No. 62/200,920, filed on Aug. 4, 2015, provisional application No. 62/200,781, filed on Aug. 4, 2015.

(51) Int. Cl.
| | |
|---|---|
| *G06F 17/00* | (2019.01) |
| *G06F 17/21* | (2006.01) |
| *G06F 8/38* | (2018.01) |
| *G06F 9/451* | (2018.01) |
| *G06F 16/957* | (2019.01) |

(52) U.S. Cl.
CPC ............ *G06F 17/212* (2013.01); *G06F 8/38* (2013.01); *G06F 9/451* (2018.02); *G06F 9/452* (2018.02); *G06F 16/9577* (2019.01)

(58) Field of Classification Search
CPC ............ G06F 17/212; G06F 17/30905; G06F 9/4443; G06F 3/04883; G06F 17/211
(Continued)

(56) References Cited

U.S. PATENT DOCUMENTS

| 7,023,437 B1 | 4/2006 | Voorhies et al. | |
| 8,499,236 B1 * | 7/2013 | Keljo | G09G 5/34 715/243 |

(Continued)

OTHER PUBLICATIONS

Skutin, "What Every Frontend Developer Should Know About Webpage Rendering", published in English Jun. 30, 2014, located at http://frontendbabel.info/articles/webpage-rendering-101/, pp. 1-6.*

(Continued)

*Primary Examiner* — Manglesh M Patel
(74) *Attorney, Agent, or Firm* — Lowenstein Sandler LLP

(57) ABSTRACT

Systems and methods disclosed herein provide a method of consistently presenting a visible portion of a rendering surface on multiple user devices. The method includes obtaining, at a user device from a remote storage server, content relating to an electronic document stored on the remote storage server, and then determining layout parameters of the content. The layout parameters define a consistent layout on a virtual rendering surface for the content of the electronic document across multiple user devices having different dimensions of display areas. The method further includes obtaining, via a user interface at the user device, a user indication indicative of a visible portion of the electronic document to be displayed via the user interface. The method further includes determining rendering parameters to render the visible portion at the user interface, and rendering the visible portion via the user interface on the user device.

18 Claims, 9 Drawing Sheets

(58) Field of Classification Search
USPC .................. 715/201, 200, 243, 238, 252
See application file for complete search history.

(56) References Cited

U.S. PATENT DOCUMENTS

| | | | | |
|---|---|---|---|---|
| 8,610,724 | B2* | 12/2013 | Garg | G06F 17/30905 |
| | | | | 345/418 |
| 8,656,290 | B1 | 2/2014 | Greenspan et al. | |
| 9,330,065 | B2* | 5/2016 | Damera-Venkata | ........................ |
| | | | | G06F 17/248 |
| 9,367,641 | B2* | 6/2016 | Kwan | G06F 17/30899 |
| 9,436,673 | B2* | 9/2016 | Gera | G06F 17/211 |
| 9,747,582 | B2 | 8/2017 | Hunter et al. | |
| 2006/0200755 | A1 | 9/2006 | Melmon et al. | |
| 2007/0220419 | A1* | 9/2007 | Stibel | G06F 16/9577 |
| | | | | 715/234 |
| 2011/0119573 | A1 | 5/2011 | Rudolph et al. | |
| 2011/0273464 | A1 | 11/2011 | Brunner et al. | |
| 2014/0108909 | A1 | 4/2014 | Geelnard | |
| 2014/0189487 | A1 | 7/2014 | Kwan et al. | |
| 2014/0208197 | A1* | 7/2014 | Ellis | G06F 17/212 |
| | | | | 715/234 |
| 2014/0325372 | A1 | 10/2014 | Spracklen et al. | |
| 2015/0095854 | A1 | 4/2015 | Olenick et al. | |
| 2016/0110326 | A1 | 4/2016 | Ryan et al. | |

OTHER PUBLICATIONS

Stefanov, "Rendering: repaint, reflow/relayout, restyle", published Dec. 17, 2009, located at http://www.phpied.com/rendering-repaint-reflowrelayout-restyle/, pp. 1-11.*

Knutson, "Display Loading Image While Page Loads", published Apr. 15, 2013, located at http://bradsknutson.com/blog/display-loading-image-while-page-loads/, pp. 1-3.*

Skutin, "What Every Frontend Developer Should Know About Webpage Rendering", published in English Jun. 30, 2014, published at http://frontendbabel.info/articles/webpage-rendering-101/, pp. 1-6.*

Stefanov, "Rendering: repaint, reflow/relayout, restyle", published Dec. 17, 2009, published at http://www.phpied.com/rendering-repaint-reflowrelayout-restyle/, pp. 1-11.*

Knutson, "Display Loading Image While Page Loads", published Apr. 15, 2013, published at http://bradsknutson.com/blog/display-loading-image-while-page-loads/, pp. 1-3.*

Marur et al., "Comparison of Platform Independent Electronic Document Distribution Techniques", published Mar. 2012, 2012 International Conference on Devices, Circuits and Systems (ICDCS), pp. 297-301.

Written Opinion and International Search Report dated Dec. 10, 2016 issued by the European Patent Office in International Application No. PCT/US2016/45571.

TutorialsPoint, "HTML5 Canvas—Save and Restore States", Jul. 4, 2014, obtained via Internet Archive Wayback Machine located at https://web.archive.org/web/20140704 163213/https://www.tutorialspoint.com/html5/canvas_states.htm, pp. 1-2.

TutorialsPoint, "XML Tree Structure", Jul. 25, 2014, obtained via Internet Archive Wayback Machine located at https://web.archive.org/web/20140725195014/https://www.tutorialspoint.com/xml/xml_tree_structure.htm, pp. 1-3.

Apple, "Coordinate Systems and Transforms", published Sep. 19, 2012, located at https://developer.apple.com/library/content/documentation/Cocoa/Conceptual/CocoaDrawingGuide/Transforms/Transforms.html, pp. 1-21.

* cited by examiner

SYSTEMS AND METHODS FOR INTERACTIVELY PRESENTING A VISIBLE PORTION OF A RENDERING SURFACE ON A USER DEVICE

CROSS REFERENCE

This application is a non-provisional of and claims priority under 35 U.S.C. 119 to commonly-assigned and U.S. provisional application Nos. 62/200,920 and 62/200,781, both filed on Aug. 4, 2015.

This application is related to co-pending Patent Cooperation Treaty application no. PCT/US16/45571 and U.S. non-provisional application Ser. No. 15/228,387, both of the same title and filed on the same day.

The aforementioned applications are all hereby expressly incorporated by reference in their entirety.

FIELD OF THE INVENTION

In general, this disclosure relates to managing electronic documents on a remote storage system, in particular, to systems and methods for interactively presenting a visible portion of a rendering surface on a user device.

BACKGROUND

A remote storage system can store various electronic documents at a remote location accessible via a network connection by a user device. For example, a user can operate a user device to access an electronic document from the remote storage system, and thus can view the electronic document from a user interface at the user device. In this case, the user device receives the content of the electronic document, and presents the content on a user interface for the user to view.

The rendering process for electronic documents can be different on different user device platforms, such as a personal computer operating system, a mobile operating system, and/or the like. Programming modules and/or objects for the rendering process can be duplicated on different platforms, and any changes to the rendering module may need to be integrated for all different platforms. As different platforms can have different parameters to layout an electronic document according to the size of the user device screen, the same electronic document can be rendered differently on each of the different platforms. For example, an image within an electronic document can be presented or rendered on page 5 of the document on a desktop; but the same image within the same electronic document can be presented or rendered on page 20 of the document on a mobile phone, because the mobile phone may have a smaller rendering screen and the same document may be rendered to have more pages on the mobile phone than on a desktop computer. In this way, when multiple users are viewing the same document via different platforms (e.g., during a joint conference presentation, etc.), the different views of the document can lead to confusion among the users.

When the electronic document includes graphical content such as an image, the image content may need more time to load from the remote storage system. Latency can be experienced by a user when the user tries to access the electronic document when the user device waits to obtain image content from the remote storage server.

SUMMARY

Systems and methods disclosed herein provide a method of consistently presenting a visible portion of a rendering surface on multiple user devices. The method includes obtaining, at a user device from a remote storage server, content relating to an electronic document stored on the remote storage server, and then determining layout parameters of the content. The layout parameters define a consistent layout on a virtual rendering surface for the content of the electronic document across multiple user devices having different dimensions of display areas. The method further includes obtaining, via a user interface at the user device, a user indication indicative of a visible portion of the electronic document to be displayed via the user interface. The method further includes determining rendering parameters to render the visible portion at the user interface, and rendering the visible portion via the user interface on the user device.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
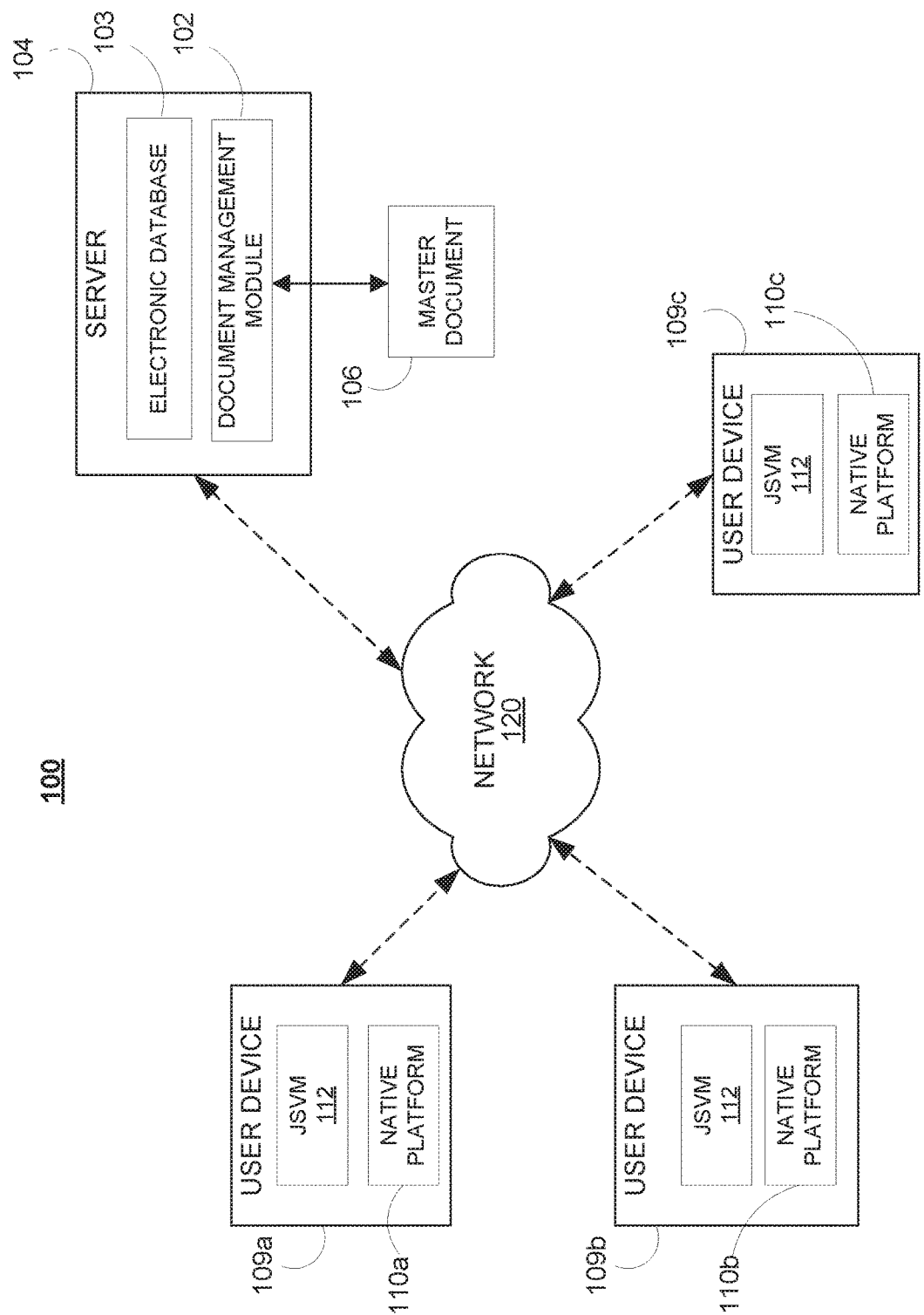
FIG. 1 is a diagram of a computerized system 100 for providing a collaborative document environment, according to an illustrative embodiment.

To provide an overall understanding of the systems and methods described herein, certain embodiments will now be described, including a system and method for interactively presenting a visible portion of a rendering surface on a user device. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Systems and methods described herein relate to presenting a remotely accessible document on a local user device. The electronic content of the document is obtained by a user device, and presented in a visible area of the user interface of the user device. A layout process is performed to determine layout parameters, e.g., the position of an object such as a paragraph, an image, a table, and/or the like, such that the electronic content can be presented on a virtual rendering surface. For example, content with 500 paragraphs and 16 figures can be laid out as a 40-page long document. A rendering process is performed to render the electronic layout of the document on a visible area of a user interface of the user device. For example, the rendering process may determine what portion to be presented for the user to view as the user may scroll down the screen. Throughout the disclosure, the term "canvas" refers to a virtual rendering surface to render an electronic document; the term "paint" refers to rendering the electronic content onto a canvas; and the term "viewport" refers to a visible area of a user interface on the user device.

Systems and methods described herein provide a mechanism for interactive rendering of a visible portion of a rendering surface (e.g., a "canvas") of unknown size. In some implementations, the electronic document to be rendered may have a size that is much greater than the visible area of the user interface on a user device. For example, when an electronic document that has been rendered as a 40-page document on the canvas is to be rendered on the user device, only a portion (e.g., 1 page or less than 1 page) of the 40 pages is to be visibly presented to a user on the user interface. The user may also interactively select a visible portion from the 40 pages of the document to be presented, e.g., by scrolling up/down the document, zooming in or out, changing font sizes, and/or the like. In response to the user interaction, the visible portion presented on the user interface may be dynamically rendered.

In some embodiments, a mechanism for rendering an image on a rendering surface is provided. In some implementations, when a user device receives image content to be rendered on a rendering surface, the image bytes may not be available as it may take a longer time to download than textual content. In this case, a placeholder can be painted until the image content is available. Once the image is available, the old portion of the canvas that contains the image is invalidated and the image bytes are re-painted onto the canvas.

In some embodiments, the rendering canvas can be divided into tiles and content of the document canvas can be rendered onto the tiles. It is noted that the tiles can be virtual units of the canvas and the content are rendered into the canvas, and the grid of tiles facilitates the rendering process to decide at which portion of the canvas (e.g., which tiles) the content should be rendered. Tiles that are visible on a user device screen can be re-rendered in response to a user's action (e.g., when a user is scrolling the document, zooming in or out, etc.), instead of re-rendering the entire document. In this way, computation complexity of rendering the document can be reduced, and a user can interactively view the rendered content with a fast scrolling user experience with improved rendering latency.

FIG. 1 is a diagram of a computerized system 100 for providing a remote storage system to support a shared layout mechanism, according to an illustrative embodiment. Some embodiments of the systems and methods described herein provide a shared layout mechanism implemented with a remote storage system. System 100 includes a server 104 and one or more user devices, e.g., devices 109a-c, connected over a network 120. The server 104 includes an electronic database 103 and a document management module 102, which manages access requests, operation requests (e.g., save, restore, open, etc.) and updates to various versions of a master document 106 stored with the server 104. The master document 106 may be stored on the electronic database 103 on the server 104, or in a separate storage device.

The user devices 109a-c may include a variety of different devices, such as but not limited to a desktop computer, a laptop computer, a personal digital assistant (PDA), a Smartphone, a table computer, a workstation, and/or the like. Each of the user devices 109a-c may include a native platform 110a-c instantiated on the respective user device 109a-c, e.g., an operating system (OS) running on a desktop or laptop computer, a mobile (OS) running on a Smartphone, etc. The user device 109a-c may further includes a shared layout mechanism in the form of a Javascript virtual machine (JSVM 112) or other suitable form on the mobile platforms and in the browser on desktop. For example, the shared layout components can be written in the Javascript language, and the JSVM 112 can be executed on different platforms. For example, the platforms can include but not limited to APPLE® iOS, ANDROID® OS, and a browser application on a desktop or laptop computer, and/or the like. The shared component can possibly be replicated on another platform that can run a JSVM and if the native code on the other platform can communicate with the JSVM.

For example, the JSVM 112 can calculate the positions of individual document content pieces on a rendering surface of the user interface. Layout parameters such as the position of a specific word, sentence or paragraph, the position of a specific image in the document, and/or the like are then provided to different native platforms instantiated on different user devices. The native platform 110a-c can in turn use the same layout parameters to generate commands to place the relevant objects (e.g., words, sentences, paragraphs, images, etc.) onto a visible user interface on the respective user device screen. In this way, the same shared layout model (e.g., JSVM 112) can render an electronic document in a same layout on different user device platforms. For example, if an electronic document is rendered as a 40-page document on a desktop computer, the same electronic document will be rendered as the same 40-page document on a Smartphone, even if the Smartphone has a much smaller rendering surface. In one implementation, with the shared layout model (e.g., JSVM 112), each individual user device can use the shared layout model instead of having to develop new layout modules for different native platforms 110a-c. In this way, computation complexity at the native platform can be reduced.

In some implementations, the JSVM 112 can implement a painting component that is also independent of the native platform (e.g., configured by the native platform but the painting engine and code is shared). An application programming interface (API) for the layout, paint or canvas can be shared between different platforms.

Figure 2:
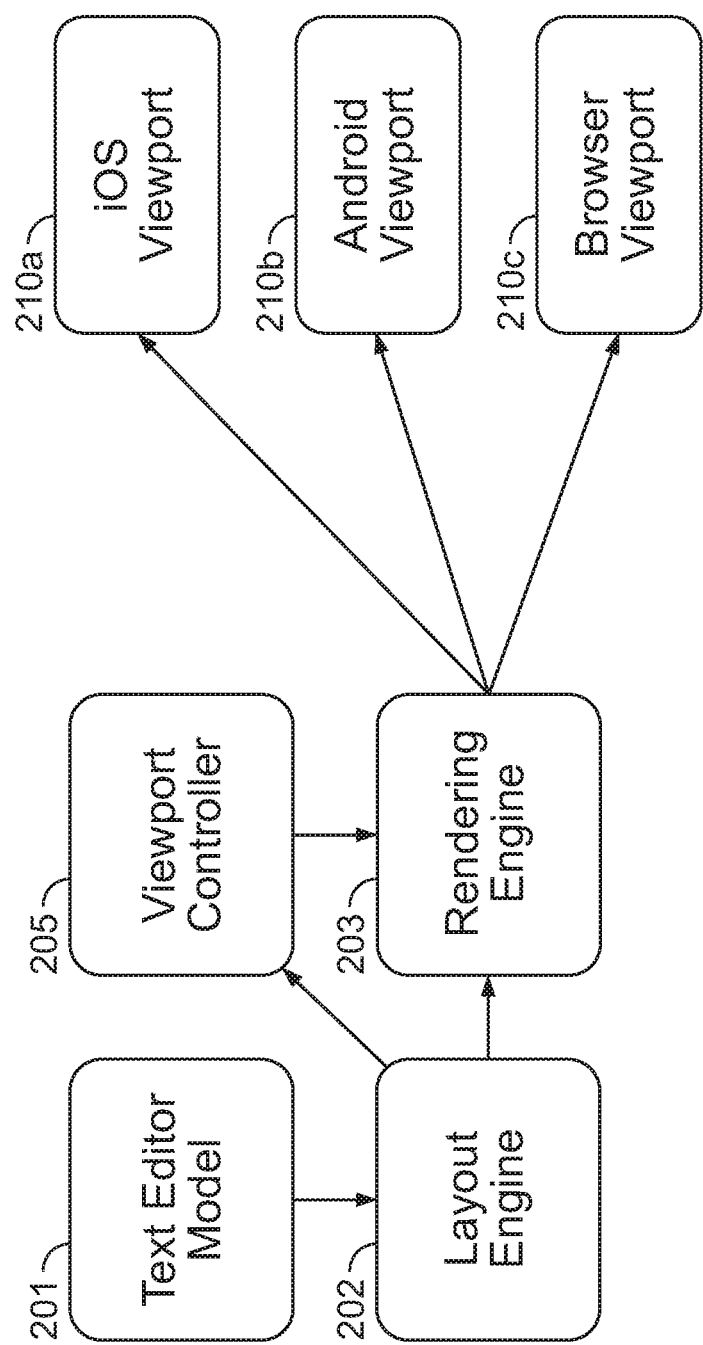
FIG. 2 provides an example block diagram illustrating an architecture of a shared layout mechanism for an application model, according to an illustrative embodiment.

FIG. 2 provides an example block diagram illustrating an architecture of a shared layout mechanism for an application model. For example, an application model can include a text editor model 201. The viewports 210*a-c* (e.g., a user interface area that presents a portion of an electronic document from the text editor on a user device), of the text editor 201 across different platforms (such as different mobile operating systems, or different browsers on a computer, etc.), can be updated by a shared controller module.

The text editor model 201 may include information required to render the document, such as but not limited to textual content, image, font size, formatting parameters, and/or the like. The text editor model 201, however, may not need to generate any layout or rendering parameters, such as the position of a paragraph, an image, and/other objects when rendering the document, and/or the like. The layout engine 202 can be configured to process a document model from the text editor model and build a layout tree that contains the position information required for rendering. For example, the layout tree may have a root node as the entire document, a group of sub-nodes for a number of pages, and subsequently each sub-node of page may be further extended by sub-nodes of paragraphs, and so on. The rendering engine 203 can use the positioning information to issue canvas calls, e.g., a function in Javascript to present the content lay-out on a canvas, and then subsequently render a visible portion of the canvas on the various viewports 210*a-c*.

When a document model is updated (e.g., saved, restored, edited, and/or the like), the layout engine 202 may update the layout tree and notify the viewport controller 205 of the regions that need to be updated. The viewport 210*a*, 210*b* or 210*c* can then issue a paint request, e.g., to present a portion of the content of the electronic document via a visible user interface area on the user device.

For example, when the document is opened for the first time, the viewport controller 205 is notified that the entire view of the document needs to be updated. As mentioned earlier, the rendering engine 203 can generate and cache rendering information in a rendering tree and issue canvas calls to a specific region of the document. The viewport 210*a-c* may request a minimal number of canvas calls required at a time as those calls may be resource intensive to execute.

Figure 3:
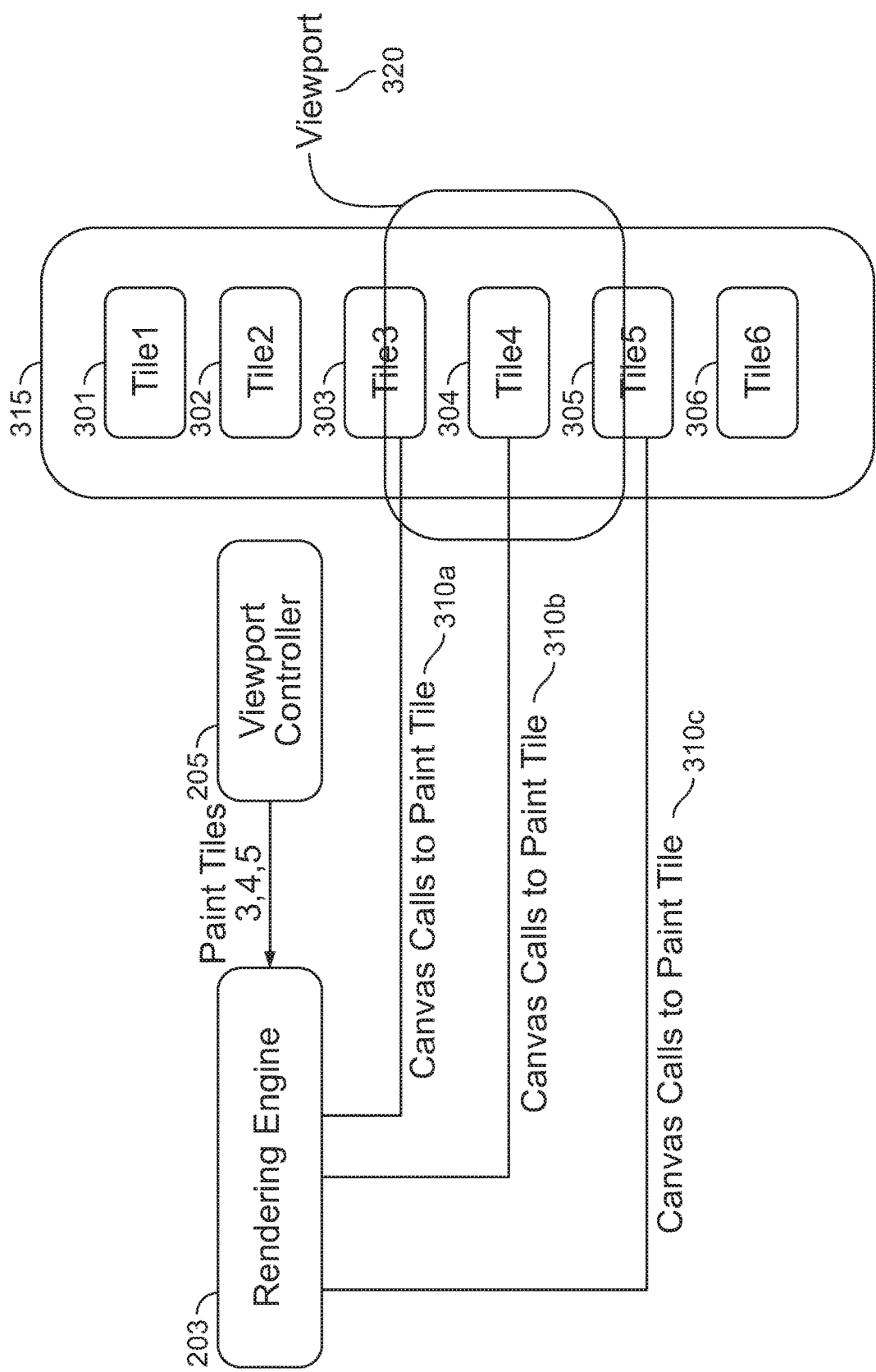
FIG. 3 provides an exemplary block diagram illustrating aspects of interactively rendering content of an electronic document on a viewport, according to an illustrative embodiment.

FIG. 3 provides an exemplary block diagram illustrating aspects of interactively rendering content of an electronic document on a viewport. In some implementations, the viewport controller 205 divides the canvas 315 into regions referred to as tiles 301-306. The tiles 301-306 are made the smallest units for which paint calls are requested from the rendering engine 203 (in other words, it is generally not possible to render only a portion of tile). The size of the tiles 301-306 is chosen based on various parameters including the size of the viewport and rendering engine limitations. For example, issuing paint calls to multiple small tiles might not be as efficient as painting a big tile that covers them all; and invalidating a big tile may be resource consuming when only a small portion of the big tile needs to be updated. Thus the size of the tiles may be determined depending on multiple factors. For example, the combination of all tiles should cover the entire canvas. However, only a limited subset of the tiles may be loaded and painted at a certain time depending on the viewport. This subset can include visible tiles (the tiles that overlap with the viewport).

In one implementation, the viewport controller 205 may choose to pre-render a few of nonvisible tiles in the vicinity of viewport to allow faster scrolling without rendering latency. It should be noted that painting of the tiles can be a resource intensive and time consuming operation and once the paint process of a tile is started, it is difficult to cancel. In the respective example of a text editor, the width of the viewport 320 is known (e.g., can be the same as the width of the tile) while the height is unknown (e.g., the viewport 320 can overlap with one or more tiles).

For example, as shown in the respective example in FIG. 3, tiles 3, 4, 5 (e.g., 303-305) overlap with the viewport 320 and may need to be painted. Therefore the viewport controller 205 requests the painting of tiles 3, 4, 5 from the rendering engine 203, resulting in the canvas calls 310*a-c* being issued to those tiles 303-305 to paint them.

Figure 4:
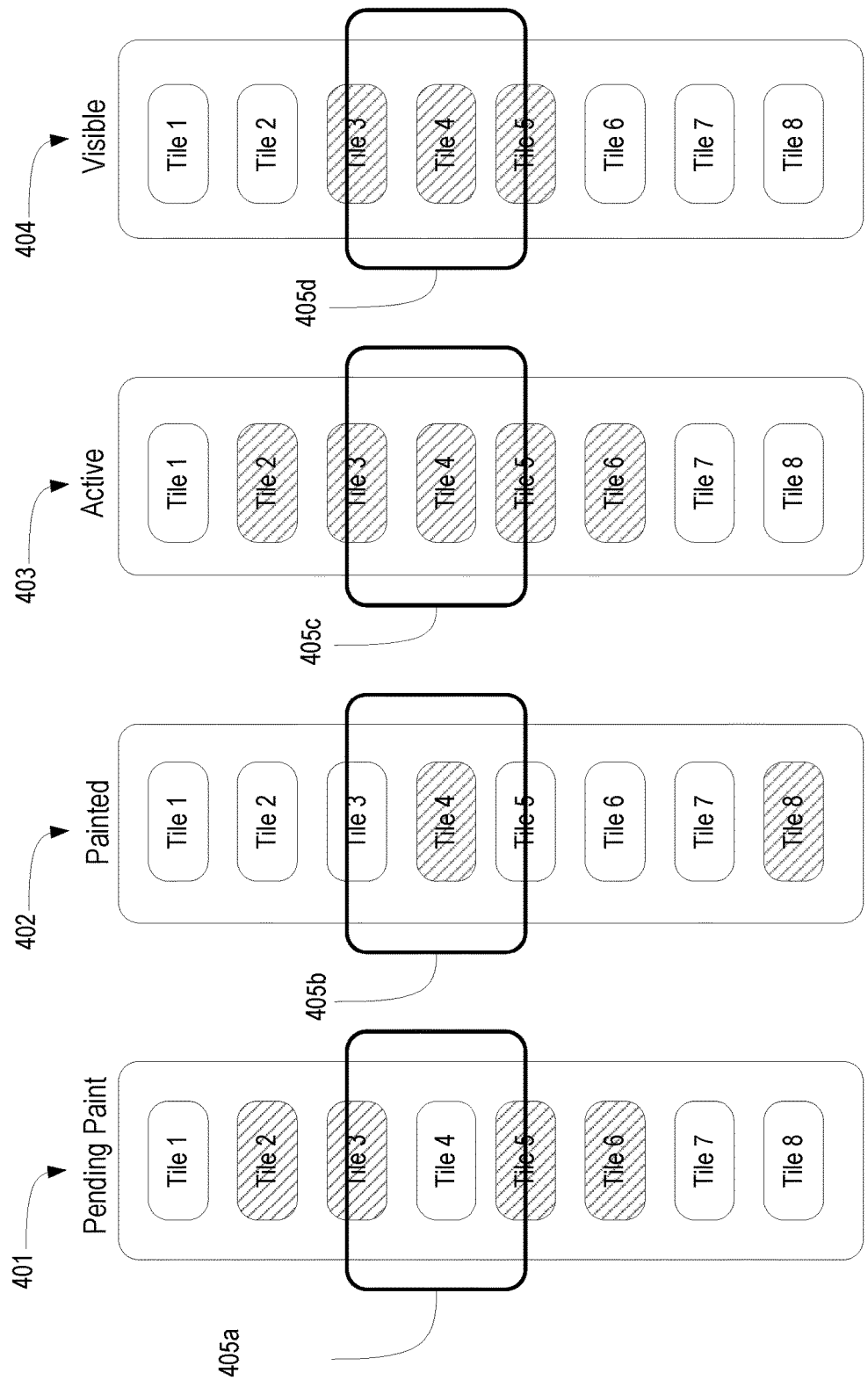
FIG. 4 provides an exemplary block diagram illustrating various statuses of tiles on a canvas, according to an illustrative embodiment.

FIG. 4 provides an exemplary block diagram illustrating various statuses of tiles on a canvas. As the user scrolls in the view, the viewport (e.g., 405*a-d*) changes and overlaps with a different set of tiles. In this case, the viewport controller may request the painting of the tiles in a way that the user experiences a smooth scrolling. For example, the viewport controller should try not to impose a heavy load on the thread that performs the scrolling to avoid stuttering in the scrolling behavior. The painting of the tiles may be done on another thread other than the scrolling thread to provide higher performance scrolling. However, when platform limitations may not allow both tasks to be done on the same thread, painting may be done to a secondary memory on another thread and later copied over to the screen.

In one implementation, paint jobs may not be cancelled once they start, and the viewport controller may build its own scheduling queue for painting of the tiles so that it has the ability to schedule and reschedule the paint operations. To ensure a smooth scrolling experience for a user with little latency, the viewport controller may paint tiles ahead of time before the user scrolls to related tiles, and caches the output of the paint. The output of the paint process can be cached in a format that requires minimum memory so that as many tiles can be cached as possible. Additionally, the saved format can have enough information to render tiles at all zoom scales. For example, example caching formats for the tiles may include, but not limited to PDF format, a display list, and/or the like.

As shown in FIG. 4, the viewport controller keeps various lists of different statuses of the tiles. For example, active tiles (as illustrated by the shaded tiles on canvas 403) are tiles that roughly overlap with a viewport 405*c*, and include a set of tiles that are pre-rendered for smooth scrolling. Anytime the viewport changes as the result of user scrolling or other actions, the set of active tiles for the viewport may need to be updated. For another example, visible tiles (as illustrated by tiles 3, 4, and 5 on canvas 404) are the set of tiles that strictly overlaps the viewport 405*d*. Visible tiles can be a subset of the active tiles. For another example, painted tiles (as illustrated by the tiles 4 and 8 on canvas 402) are the set of tiles that are fully painted. For another example, pending-paint tiles (as illustrated by the tiles 2, 3, 5 and 6 on canvas 401) are the list of tiles that are scheduled to be painted. The pending-paint tiles can be a subset of the active tiles.

When the viewport 405*c* changes, the list of active tiles is updated, and tiles that are no longer active are removed from the set of tiles that are pending to be painted. A scheduler keeps track of the status of the set of pending-paint tiles, and schedules a time when painting should be requested. The painting request can be scheduled on a separate operation queue. The output of the painting process may not be presented on the actual screen immediately; instead, an intermediate storage stores the painted tiles as a PDF or a picture. Once the operation executed, it requests the paint and notifies the viewport controller when the painting job is complete to schedule the next pending tile paint. If the painting of a tile is scheduled but hasn't started and the tile becomes inactive, the scheduled paint will be cancelled. Once the painting process is complete for a visible tile or a painted tile becomes visible, the result of painting can be presented on the screen. The viewport controller can choose to invalidate a number of tiles if it is notified that the content of those tiles are out of date. The invalidated tiles are instantly removed from the set of painted tiles, and the viewport controller may schedule them for painting if they are active.

Figure 5:
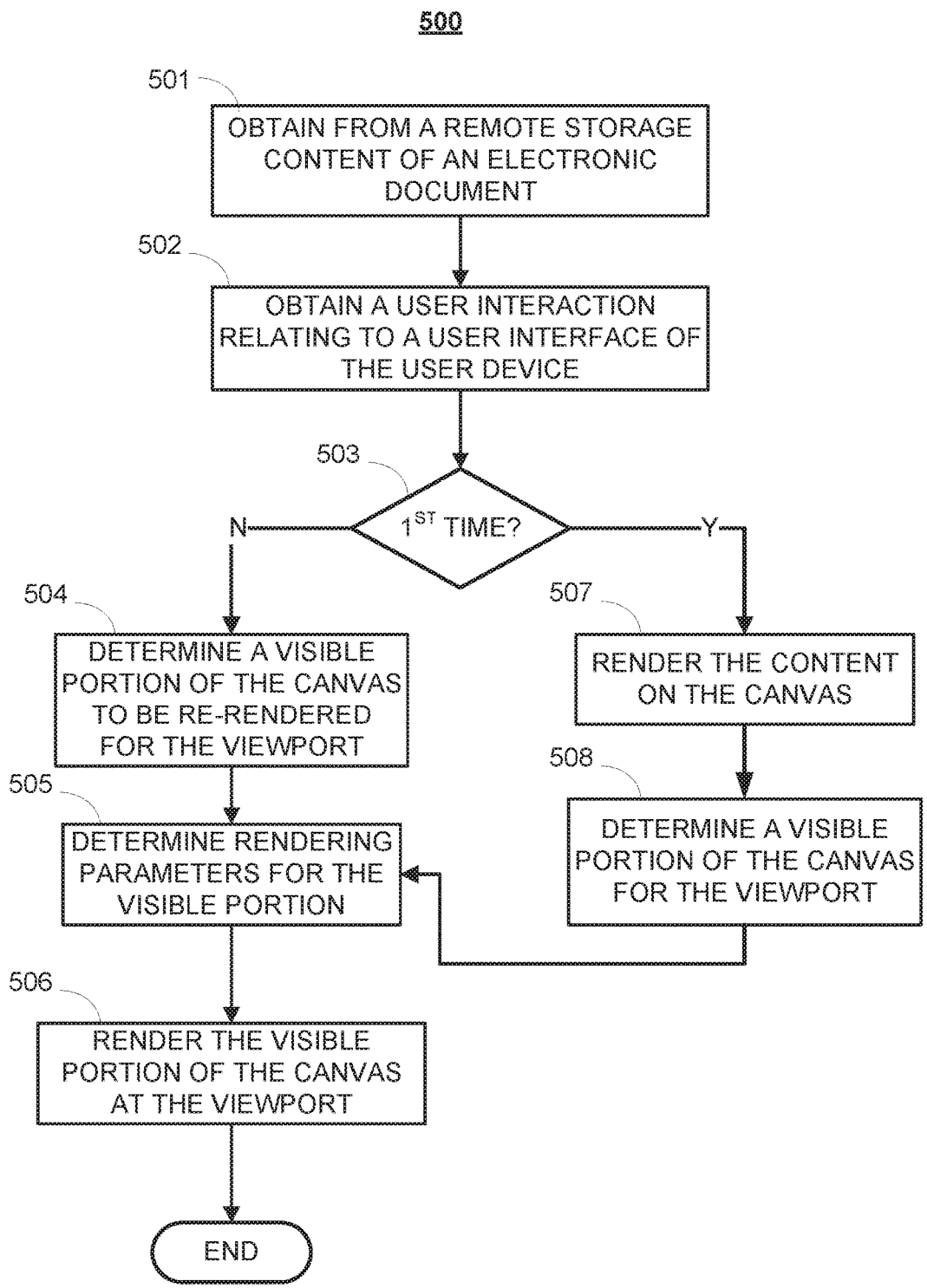
FIG. 5 provides an exemplary logic flow diagram 500 illustrating aspects of rendering a visible portion of a rendering surface at a viewport of a user device, according to an illustrative embodiment.

FIG. 5 provides an exemplary logic flow diagram 500 illustrating aspects of rendering a visible portion of a rendering surface at a viewport of a user device. At 501, a user device may obtain from a remote storage (e.g., a cloud storage system, etc.), content of an electronic document. At 502, the user device may obtain a user interactive action from a user interface of the user device, e.g., opening a document, page-up or page-down commands, scrolling movements, zoom-in or zoom-out commands, and/or the like. The user interactive action can be related to a visible portion of the canvas, e.g., the page-up or page-down, or zoom-in or zoom-out commands can indicate a visible portion of the canvas that is to be presented at the user interface visible to the user.

If it is the first time the document is rendered at the user interface of the device at 503, the entire content may be virtually rendered on the canvas at 507, and a visible portion of the canvas is determined for the viewport at 508. If the document has been previously rendered and the user interaction indicates an update at 503, a visible portion of the canvas that is to be re-rendered or updated in response to the user interaction is determined at 504.

Continuing on with 505, rendering parameters are then determined for the visible portion of the canvas, e.g., width and height of the visible portion from the canvas to be rendered, etc. The visible portion may then be rendered or re-rendered at the viewport at 506.

Figure 6:
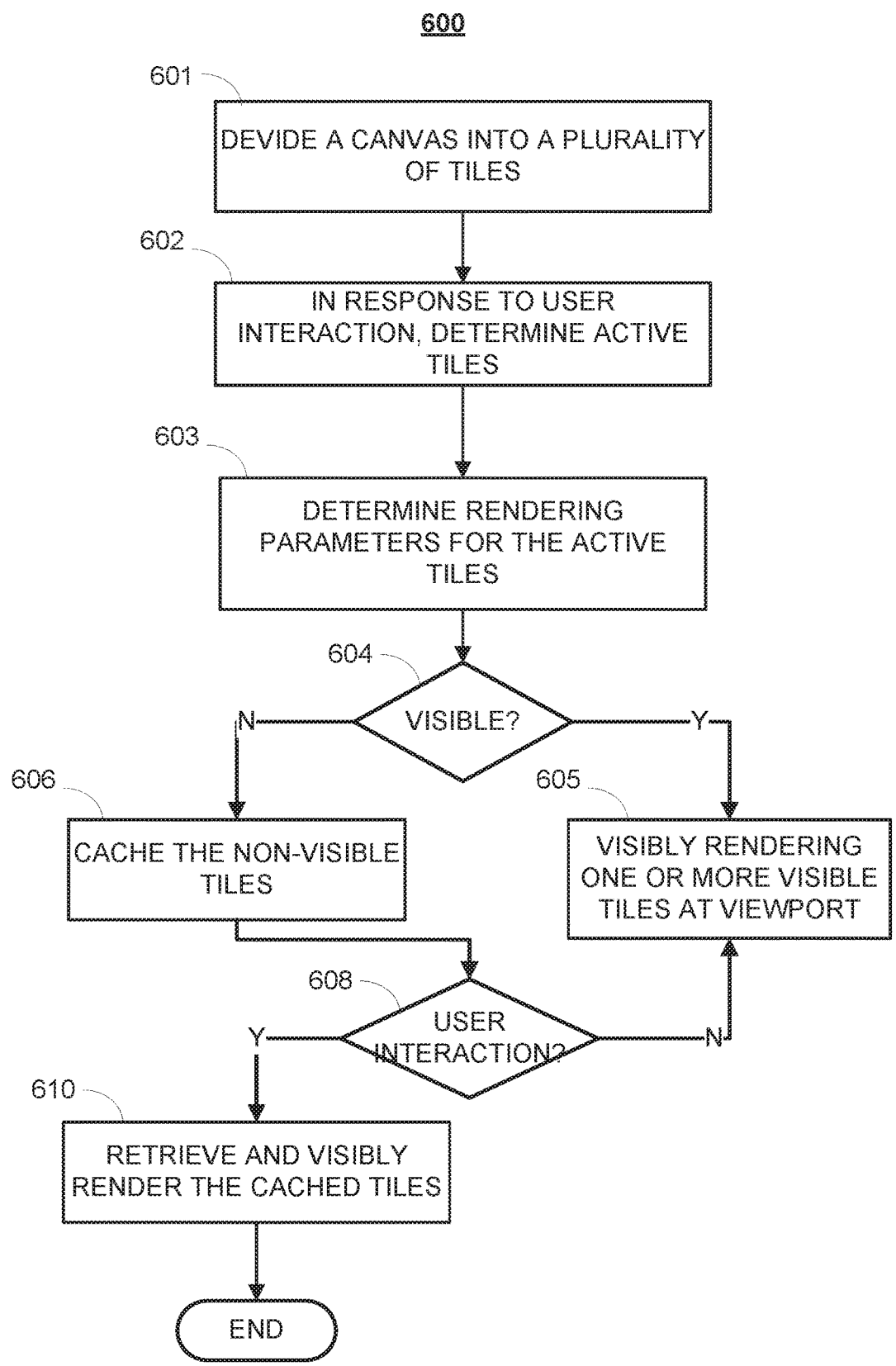
FIG. 6 provides an exemplary logic flow diagram 600 illustrating aspects of maintaining tiles of a canvas (e.g., see FIG. 4) to update or re-render a visible portion of a canvas at a viewport, according to an illustrative embodiment.

FIG. 6 provides an exemplary logic flow diagram 600 illustrating aspects of maintaining tiles of a canvas (e.g., see FIG. 4) to update or re-render a visible portion of a canvas at a viewport. For example, the canvas can be divided into a plurality of tiles (e.g., similar to 301-306 in FIG. 3) at 601. In response to user interactions with a document (e.g., page-up or page-down commands, scrolling etc.), a list of active tiles (e.g., similar to tiles in 403 in FIG. 4) are determined at 602. For example, the active tiles include one or more tiles that overlap with the viewport and a few more tiles in the vicinity of the viewport. The tiles that overlap with the viewport are visible and need to be rendered, while the tiles in the vicinity that are not yet visible can be pre-rendered for smooth scrolling, determined at 604. At 603, rendering parameters can be determined for the active tiles, and making visible one or more visible tiles from the active tiles at the viewport at 605. Otherwise, for nonvisible tiles from the active tiles, these tiles are to be cached at 606. Thus, when another user interaction is received at 608, e.g., when the user scrolls the viewport such that the nonvisible tiles become visible in the viewport, the cached tiles can be retrieved and made visible at the viewport without rendering latency at 608. In this way, the user experience in smooth scrolling can be improved.

Figure 7:
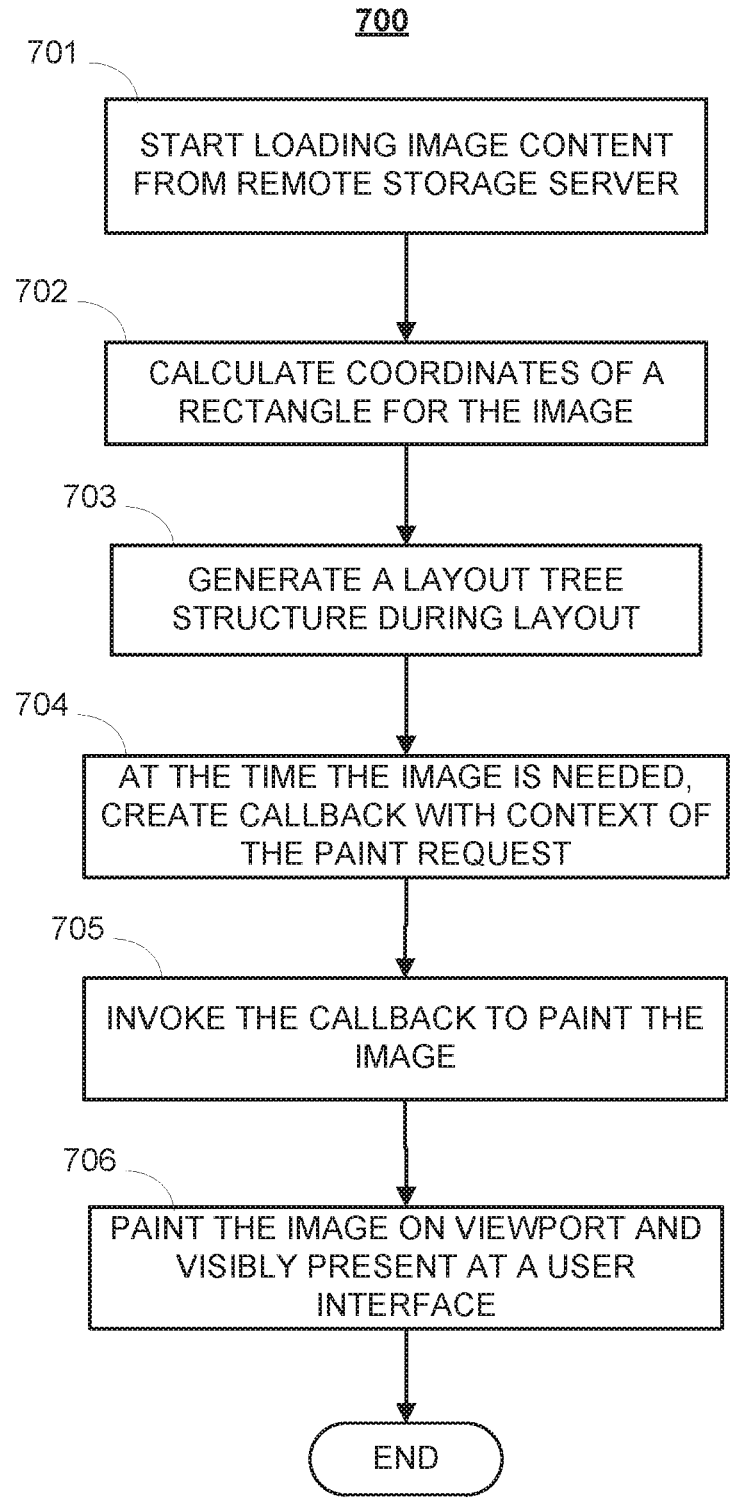
FIG. 7 provides a logic flow diagram illustrating aspects of loading and rendering an image within an electronic document at a viewport, according to an illustrative embodiment.

FIG. 7 provides a logic flow diagram 700 illustrating aspects of loading and rendering an image within an electronic document at a viewport. In some implementations, upon starting to load image content from a remote storage server at 701, the rectangle enclosing the image in absolute coordinates can be calculated at 702. For example, a tree structure of relative coordinates can be used to determine the absolute coordinates. Portions of the tree can be orphaned due to changes in layout between the time the image is requested to load and when the image is being loaded. During the layout of the document content, a nested tree structure can be generated at 703, which is later used to paint the document to the canvas. Each element of the tree is positioned relative to its parent and siblings. This allows portions of the tree to be moved around without recalculating the position of each element in the subtree.

Figure 8:
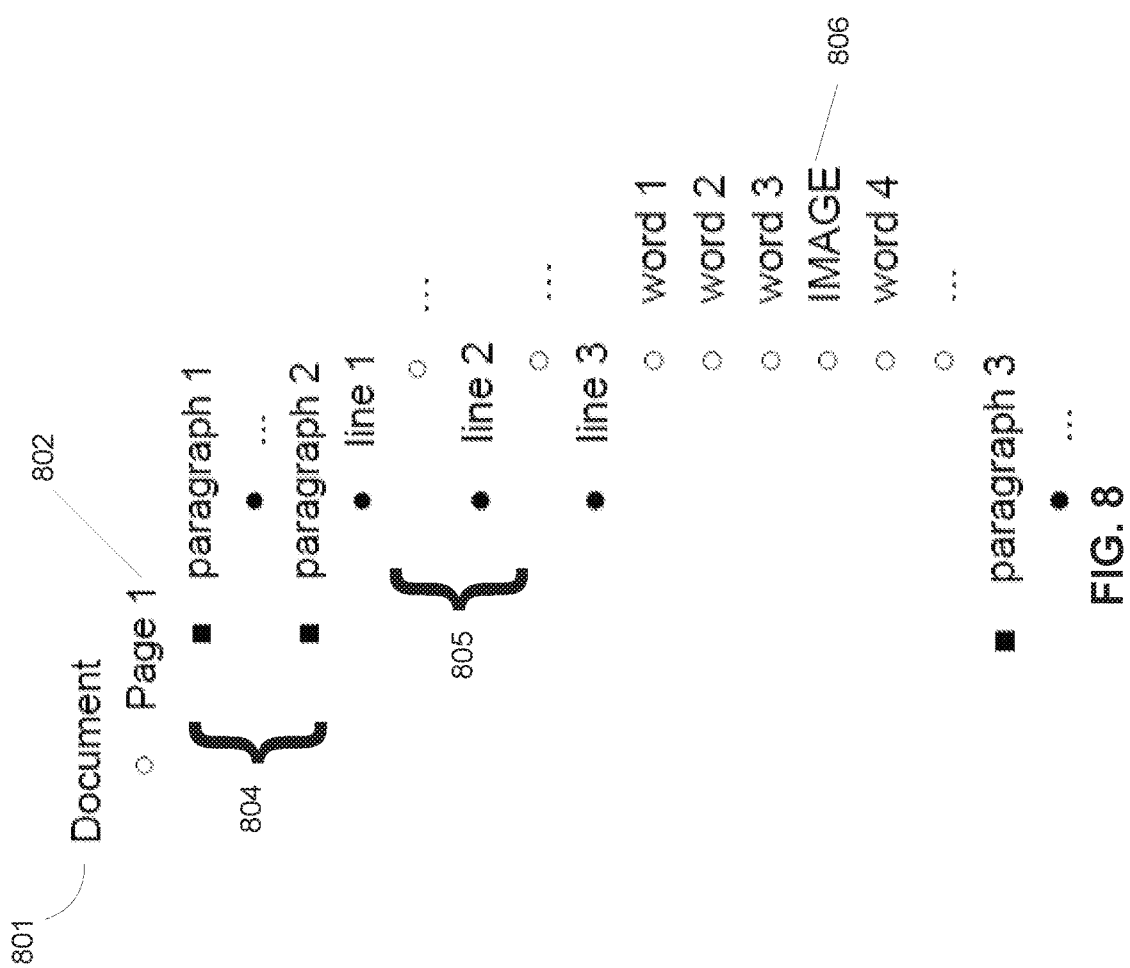
FIG. 8 shows an example tree structure of a layout tree, according to an illustrative embodiment.

For example, FIG. 8 shows an example tree structure of a layout tree. During the layout process of the first page 802 of the document 801, several paragraphs 804 are created. In the second paragraph, several lines 805 can be created. In the middle of the third line, an image 806 is placed. A reduced tree traversal from child node to the root (if not orphaned) can be implemented to locate the image 806, which can be significantly faster than performing a full tree traversal (searching every node until the image 806 is found).

Back to the flow diagram 700 in FIG. 7, at the time the image is needed (e.g., when the image is being painted on the viewport for the first time), a callback is created with the context of the paint request at 704, such as the relative layout information. The callback can be invoked later, once the image is ready to be painted, at 705. When the callback is invoked, it only has access to the relative information known during the first paint process, without changing the layout tree. The layout tree can be a permanent structure that is only mutated during a layout process. Upon finishing the painting, the image is visibly presented at a user interface of the user device at 706.

At paint time, the canvas can be positioned such that the image can be drawn directly without determining coordinates, as the coordinates have been calculated at 702, and such information is available to the callback at 704. If the document is mutated, for example, a page of text inserted between paragraph 1 and 2, paragraph 2 may not need to re-lay out the lines within paragraph 2, as they already have been sized and positioned.

In this way, different objects such as images, charts, tables, embedded content with live updates (e.g., a video player, etc.) or any other objects layout with a fixed dimension, can be painted onto a viewport based on the absolute coordinates of the object, without re-laying out the entire document content. This provides improved flexibility and efficiency in what is being repainted, rather than repainting the entire document or whole pages.

Figure 9:
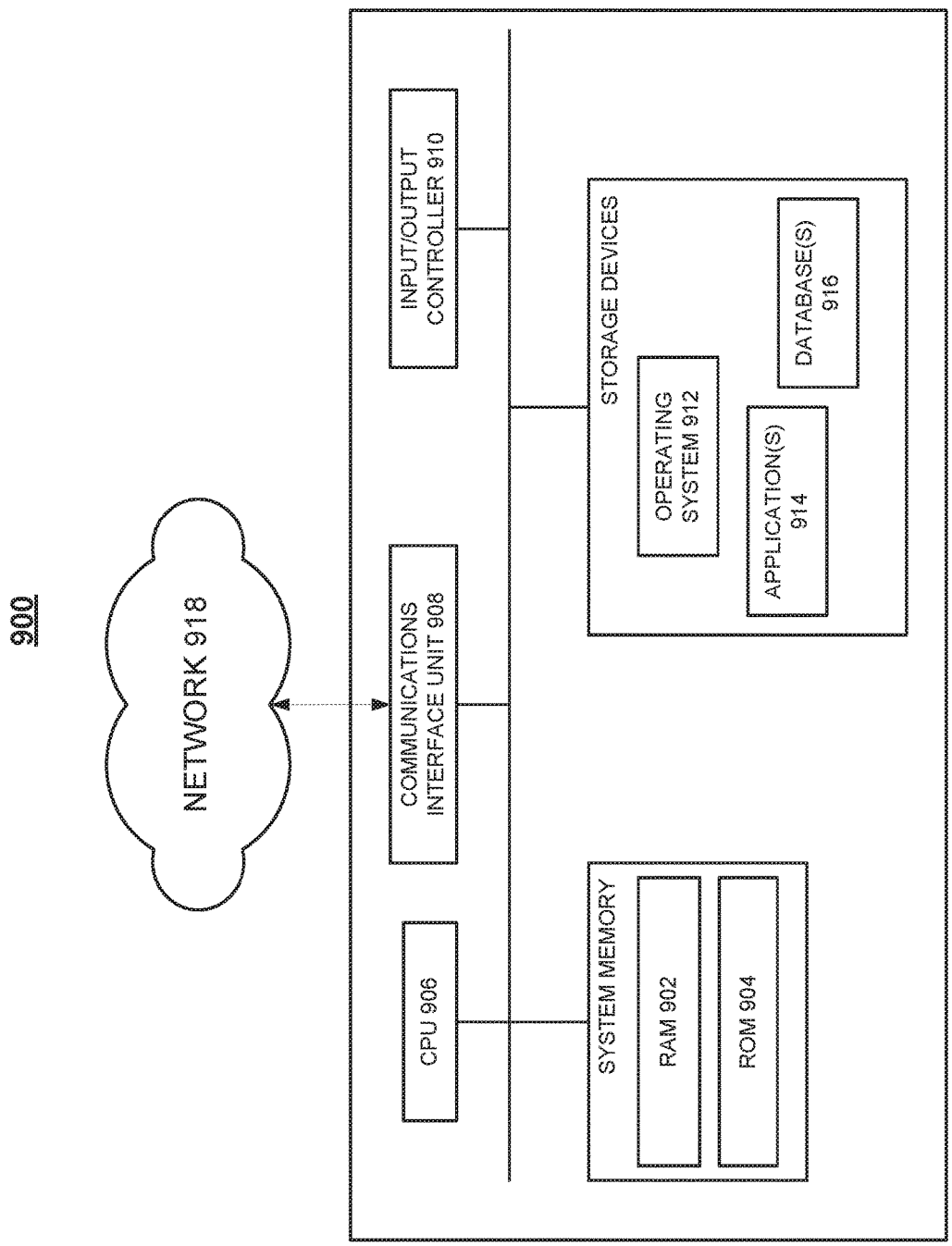
FIG. 9 is a block diagram illustrating an exemplary computer system 900 with which the system for rendering a visible portion of a rendering surface at a user interface of a user device and use of FIGS. 1-8 can be implemented, according to an illustrative embodiment.

FIG. 9 is a block diagram of a computing device, such as any of the components of the systems of FIGS. 1-8, for performing any of the processes described herein. Each of the components of these systems may be implemented on one or more computing devices 900. In certain aspects, a plurality of the components of these systems may be included within one computing device 900. In certain implementations, a component and a storage device may be implemented across several computing devices 900.

The computing device 900 includes at least one communications interface unit, an input/output controller 910, system memory, and one or more data storage devices. The system memory includes at least one random access memory (RAM 902) and at least one read-only memory (ROM 904). All of these elements are in communication with a central processing unit (CPU 906) to facilitate the operation of the computing device 900. The computing device 900 may be configured in many different ways. For example, the computing device 900 may be a conventional standalone computer or alternatively, the functions of computing device 900 may be distributed across multiple computer systems and architectures. Alternatively, a computer system may be virtualized to provide the functions of multiple computing devices 900. In FIG. 9, the computing device 900 is linked, via network or local network, to other servers or systems.

The computing device 900 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 908 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 906 includes a processor, such as one or more conventional microprocessors and one or more supplementary co-processors such as math co-processors for offloading workload from the CPU 906. The CPU 906 is in communication with the communications interface unit 908 and the input/output controller 910, through which the CPU 906 communicates with other devices such as other servers, user terminals, or devices. The communications interface unit 908 and the input/output controller 910 may include multiple communication channels for simultaneous communication with, for example, other processors, servers or client terminals.

The CPU 906 is also in communication with the data storage device. The data storage device may include an appropriate combination of magnetic, optical or semiconductor memory, and may include, for example, RAM 902, ROM 904, flash drive, an optical disc such as a compact disc or a hard disk or drive. The CPU 906 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 906 may be connected to the data storage device via the communications interface unit 908. The CPU 906 may be configured to perform one or more particular processing functions.

The data storage device may store, for example, (i) an operating system 912 for the computing device 900; (ii) one or more applications 914 (e.g., computer program code or a computer program product) adapted to direct the CPU 906 in accordance with the systems and methods described here, and particularly in accordance with the processes described in detail with regard to the CPU 906; or (iii) database(s) 916 adapted to store information that may be utilized to store information required by the program.

The operating system 912 and applications 914 may be stored, for example, in a compressed, an uncompiled and an encrypted format, and may include computer program code. The instructions of the program may be read into a main memory of the processor from a computer-readable medium other than the data storage device, such as from the ROM 904 or from the RAM 902. While execution of sequences of instructions in the program causes the CPU 906 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 912, a database management system and "device drivers" that allow the processor to interface with computer peripheral devices (e.g., a video display, a keyboard, a computer mouse, etc.) via the input/output controller 910.

The term "computer-readable medium" as used herein refers to any non-transitory medium that provides or participates in providing instructions to the processor of the computing device 900 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 906 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 900 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, an enterprise server or group of servers, one or more desktop computers, one or more laptop computers, etc. Computer system 900 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method of presenting a visible portion of a rendering surface on different user devices, the method comprising:
    obtaining, at a user device from a remote server, content and a shared layout that relate to an electronic document stored on a remote storage device, wherein the shared layout provides a layout for multiple user devices having different dimensions of display areas;
    determining layout parameters in view of the shared layout, wherein the layout parameters indicate a position of the content on a virtual rendering surface to be used to render the content of the electronic document on the multiple user devices;
    obtaining, via a user interface at the user device, a user indication indicative of a visible portion of the electronic document to be displayed via the user interface at the user device;
    determining rendering parameters of the visible portion of the electronic document based upon display parameters associated with the user device; and
    rendering the visible portion of the electronic document via the user interface on the user device based upon the rendering parameters of the visible portion of the electronic document and the layout parameters of the content of the electronic document.

2. The method of claim 1, wherein the user indication includes any of a page up or page down movement, a scrolling movement, and a zoom-in or zoom-out movement.

3. The method of claim 1, wherein the layout parameters include position parameters of an object in the content.

4. The method of claim 1, wherein the rendering parameters include at least one of a width of a visible portion, and a height of a visible portion.

5. The method of claim 1, wherein the multiple user devices include a portable device and a desktop computer.

6. The method of claim 1, wherein the multiple user devices include multiple rendering platforms, and the multiple rendering platforms include a mobile application and a browser application.

7. The method of claim 1, wherein the visible portion is determined by a dimension of the user interface.

8. The method of claim 1, further comprising:
    rendering the content of the electronic document on the virtual rendering surface based on the layout parameters.

9. The method of claim 8, further comprising:
dividing the rendering surface into a plurality of tiles; and
rendering the content of the electronic documents onto the plurality of tiles when the electronic document is first opened.

10. The method of claim 9, further comprising:
determining one or more tiles from the plurality of tiles are associated with the visible portion; and
rendering the visible portion onto the one or more tiles.

11. The method of claim 1, wherein the content include an object with a fixed dimension within an electronic document.

12. The method of claim 11, further comprising:
defining a region on the virtual rendering surface to render the object;
determining rendering information for the object;
determining that at least a portion of the object is within the visible portion of a user interface of the user device; and
using the rendering information to visibly display the at least portion of the object at the user interface.

13. The method of claim 12, further comprising:
presenting a temporary object at a position of the object while the user device is loading content relating to the object.

14. The method of claim 12, further comprising:
generating a layout tree structure relating to the electronic document, wherein the object is a node within the layout tree structure.

15. The method of claim 14, wherein the node includes position coordinates of the object relative to the virtual rendering surface.

16. The method of claim 11, wherein the object includes any of an image, a video player, or a frame of live feeds.

17. A system for presenting a visible portion of a rendering surface on different user devices, the system comprising:
a communication interface to obtain, from a remote server, content and a shared layout that relate to an electronic document stored on a remote storage device, wherein the shared layout provides a layout for multiple user devices having different dimensions of display areas;
a processor to:
determine layout parameters in view of the shared layout, wherein the layout parameters indicate a position of the content on a virtual rendering surface to be used to render the content of the electronic document on the multiple user devices;
provide a user interface to obtain a user indication indicative of a visible portion of the electronic document to be displayed via the user interface;
determine rendering parameters of the visible portion of the electronic document based upon display parameters associated with the system; and
render the visible portion of the electronic document via the user interface based upon the rendering parameters of the visible portion of the electronic document and the layout parameters of the content of the electronic document.

18. A processor-readable storage medium storing processor-executable instructions for presenting a visible portion of a rendering surface on different user devices, the processor-executable instructions executable by a processor to:
obtain, at a user device from a remote server, content and a shared layout that relate to an electronic document stored on a remote storage, wherein the shared layout provides a layout for multiple user devices having different dimensions of display areas;
determine layout parameters in view of the shared layout, wherein the layout parameters indicate a position of the content on a virtual rendering surface to be used to render the content of the electronic document on the multiple user devices;
obtain, via a user interface at the user device, a user indication indicative of a visible portion of the electronic document to be displayed via the user interface at the user device;
determine rendering parameters of the visible portion of the electronic document based upon display parameters associated with the user device; and
render the visible portion of the electronic document via the user interface on the user device based upon the rendering parameters of the visible portion of the electronic document and the layout parameters of the content of the electronic document.

* * * * *